(12) United States Patent
Jeong et al.

(10) Patent No.: US 10,695,720 B2
(45) Date of Patent: Jun. 30, 2020

(54) FLOATING TYPE MEMBRANE DISTILLATION MODULE

(71) Applicant: KOREA INSTITUTE OF SCIENCE AND TECHNOLOGY, Seoul (KR)

(72) Inventors: Seong Pil Jeong, Seoul (KR); Hyeon-joo Kim, Seoul (KR); Seockheon Lee, Seoul (KR); Seunghak Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/045,758

(22) Filed: Jul. 26, 2018

(65) Prior Publication Data

US 2019/0184340 A1    Jun. 20, 2019

(30) Foreign Application Priority Data

Dec. 19, 2017 (KR) .................. 10-2017-0174905

(51) Int. Cl.
| | |
|---|---|
| *B01D 61/36* | (2006.01) |
| *C02F 1/44* | (2006.01) |
| *C02F 1/00* | (2006.01) |
| *C02F 1/28* | (2006.01) |
| *C02F 1/20* | (2006.01) |
| *C02F 1/14* | (2006.01) |

(52) U.S. Cl.
CPC ......... *B01D 61/364* (2013.01); *B01D 61/366* (2013.01); *B01D 61/368* (2013.01); *C02F 1/001* (2013.01); *C02F 1/20* (2013.01); *C02F 1/28* (2013.01); *C02F 1/447* (2013.01); *B01D 2311/2626* (2013.01); *B01D 2311/2649* (2013.01); *B01D 2311/2653* (2013.01); *B01D 2313/06* (2013.01); *B01D 2313/22* (2013.01); *B01D 2313/36* (2013.01); *C02F 1/14* (2013.01); *C02F 2201/008* (2013.01)

(58) Field of Classification Search
CPC ................ B01D 61/364; B01D 61/366; B01D 2311/2653; B01D 2311/2626; B01D 2311/2649; B01D 2313/06; B01D 2313/22; B01D 61/368; B01D 2313/36; C02F 1/20; C02F 1/28; C02F 1/001; C02F 1/447; C02F 2201/008
See application file for complete search history.

(56) References Cited

FOREIGN PATENT DOCUMENTS

| CN | 1827532 A | | 9/2006 |
|---|---|---|---|
| CN | 102060340 B | * | 2/2013 |
| JP | 09001143 A | | 1/1997 |
| JP | 201075808 A | | 4/2010 |
| KR | 101335445 B1 | | 12/2013 |

(Continued)

OTHER PUBLICATIONS

Japanese Office Action for corresponding JP Application No. 2018-237118 dated Oct. 23, 2019.

*Primary Examiner* — Krishnan S Menon
*Assistant Examiner* — Waqaas Ali
(74) *Attorney, Agent, or Firm* — Cantor Colburn LLP

(57) ABSTRACT

The present disclosure relates to a floating type membrane distillation module for collecting sunlight to heat raw water and supplying the heated raw water to a membrane distillation separation membrane, to ensure effective heating of raw water and supply of the uniformly heated raw water to a membrane distillation separation membrane.

6 Claims, 5 Drawing Sheets

(56) References Cited

FOREIGN PATENT DOCUMENTS

| KR | 101444884 B1 | 9/2014 |
|----|--------------|--------|
| KR | 1020150012576 A | 2/2015 |
| KR | 1020150012578 A | 2/2015 |
| KR | 101525408 B1 | 6/2015 |
| KR | 101543426 B1 | 8/2015 |
| KR | 101576571 B1 | 12/2015 |
| KR | 101605536 B1 | 3/2016 |
| KR | 1020170129507 A | 11/2017 |

* cited by examiner

FLOATING TYPE MEMBRANE DISTILLATION MODULE

CROSS-REFERENCE TO RELATED APPLICATION

This application claims priority to Korean Patent Application No. 10-2017-0174905, filed on Dec. 19, 2017, and all the benefits accruing therefrom under 35 U.S.C. § 119, the contents of which in its entirety are herein incorporated by reference.

BACKGROUND

1. Field

The present disclosure relates to a floating type membrane distillation module, and more particularly, to a floating type membrane distillation module for collecting sunlight to heat raw water and supplying the heated raw water to a membrane distillation separation membrane, to ensure effective heating of raw water and supply of the uniformly heated raw water to a membrane distillation separation membrane.

2. Description of the Related Art

Membrane distillation is a process in which a phase change takes place on the surface of a hydrophobic polymer separation membrane, and vapor passes through micropores in the surface of the separation membrane, condenses and is separated, and it can be used in a desalination process for separating and removing non-volatile materials or less volatile materials, or to separate organics with high volatility in aqueous solutions.

The membrane distillation has been primarily studied in the United States, Europe, Japan and Australia since the introduction of the concept of membrane distillation in 1960. Recently, there is a growing movement towards replacing the conventional separation process using evaporation or reverse osmosis membrane with a membrane distillation separation process.

Currently, the evaporation method and the reverse osmosis membrane method used in pure manufacturing or water purification process have much energy consumption, and in particular, the reverse osmosis membrane method requires many steps of pre-treatment process before its use due to contamination and fouling problems, which makes driving and management difficult, and has a problem with consumption of much electrical energy used as a power source to operate a pump because it is driven at high pressure.

By contrast, the membrane distillation method is driven at lower pressure than the ultrafiltration method and the reverse osmosis membrane method by use of a porous membrane, and accomplishes separation by a partial vapor pressure difference. Additionally, the membrane distillation method resolves the entrainment issue of traditional distillation methods encountered in separating and removing non-volatile materials such as salts, and eliminates the need to use a filter or a separation membrane that is driven at high pressure.

Due to these advantages of the membrane distillation separation process, a water purification or desalination process using a membrane distillation method may implement an apparatus at low costs and provides good durability of the apparatus, and thus is competitive in drinking water production.

Additionally, when renewable energy or waste heat is used in the membrane distillation process, pure separation costs may be greatly reduced. Accordingly, studies have been continuously made on membrane distillation processes using waste heat or solar heat, and off-grid small-scale desalination pilot plant has been primarily proposed in which a heat source of the membrane distillation process is replaced with a solar heat collector and a solar panel is used as a power source.

The applicant also has filed many patent applications for a membrane distillation process using a solar heat collector (see Korean Patent No. 1444884, Korean Patent Publication No. 2015-12576, Korean Patent Publication No. 2015-12578), and the applicant's patents disclose an apparatus in which a solar heat collector is applied to a membrane distillation process and a floating body is provided on one side of the membrane distillation apparatus, with no need of separate cooling water supply.

RELATED LITERATURES (Patent Literature 1) Korean Patent No. 1444884
(Patent Literature 2) Korean Patent Publication No. 2015-12576
(Patent Literature 3) Korean Patent Publication No. 2015-12578

SUMMARY

The present disclosure is directed to providing a floating type membrane distillation module with optimal structure for collecting sunlight to heat raw water and supplying the heated raw water to a membrane distillation separation membrane, to ensure effective heating of raw water and supply of the uniformly heated raw water to a membrane distillation separation membrane.

To achieve the above-described object, a floating type membrane distillation module according to the present disclosure includes an upper chamber into which raw water to be treated is introduced, a lower chamber in which treated water is produced according to a membrane distillation process, a membrane distillation separation membrane provided between the upper chamber and the lower chamber, a solar heat collector provided in an internal space of the upper chamber to heat the raw water introduced into the upper chamber, and a float provided on one side of a lower end of the lower chamber to provide buoyancy, wherein the raw water on the membrane distillation separation membrane turns into vapor by a temperature difference between the upper chamber and the lower chamber, the vapor of the raw water passes through the membrane distillation separation membrane and moves to the lower chamber, and the vapor having moved to the lower chamber condenses, producing treated water.

A raw water inlet through which the raw water is introduced may be provided on one side of the upper chamber, the solar heat collector may be formed in a shape of a plate with a plurality of pores, the solar heat collector may be provided between the raw water inlet of the upper chamber and the membrane distillation separation membrane on vertical basis, the raw water introduced through the raw water inlet of the upper chamber may be supplied onto the solar heat collector and heated, the heated raw water may be supplied onto the membrane distillation separation membrane through the plurality of pores provided in the solar heat collector, and bubbles included in the raw water may be separated by floatation and discharged out through the pores of the membrane distillation separation membrane.

A filter member may be provided at the raw water inlet of the upper chamber, and the raw water may pass through the filter member and may be supplied onto the solar heat collector through the raw water inlet. Additionally, the floating type membrane distillation module may further include a cooling plate provided on a lower surface of the lower chamber to cause the vapor to condense, producing treated water.

The filter member may filter out contaminants included in the raw water, and may be formed in the form of a particulate filtration material or a filtration membrane. Additionally, the filter member may be made of an adsorptive material, or a filtration material and an adsorptive material in combination.

A raw water inlet through which raw water is introduced may be provided on one side of the upper chamber, the solar heat collector may be formed in a shape of a plate with a plurality of pores, the solar heat collector may be provided above the raw water inlet on vertical basis, the raw water introduced through the raw water inlet of the upper chamber may be supplied onto the membrane distillation separation membrane and heated, and bubbles included in the raw water may be separated by floatation and discharged out through the pores of the membrane distillation separation membrane.

The floating type membrane distillation module according to the present disclosure has the following effect.

In constructing the floating type membrane distillation module, the application of the solar heat collector with pores allows effective heating of raw water and uniform supply of the heated raw water onto the membrane distillation separation membrane, thereby improving the membrane distillation efficiency. In addition, the plurality of pores formed in the solar heat collector is used as channels through which bubbles of raw water are discharged, thereby preventing a reduction in effective membrane area of the membrane distillation separation membrane due to the bubbles, resulting in further increases in membrane distillation efficiency.

BRIEF DESCRIPTION OF THE DRAWINGS

FIG. 4A shows the temperature of a solar heat collector and cooling water (raw water), and FIG. 4B shows an amount of treated water produced through a membrane distillation process.

FIG. 5A shows the temperature of a solar heat collector and cooling water (raw water), and FIG. 5B shows an amount of treated water produced through a membrane distillation process.

DETAILED DESCRIPTION

The present disclosure presents technology about a floating type membrane distillation module that floats on raw water to be treated, and produces treated water from raw water through a membrane distillation process.

As mentioned in the 'Description of the Related Art', the membrane distillation module is configured to produce treated water from raw water by inducing a partial vapor pressure through a temperature difference between raw water and cooling water to allow vapor of the raw water to pass through a membrane distillation separation membrane.

The raw water on which the floating type membrane distillation module according to the present disclosure floats is water to be treated and also serves as cooling water of the membrane distillation process. That is, the raw water on which the floating type membrane distillation module floats is a source of raw water supply of the membrane distillation process and a source of cooling water supply. The raw water is supplied to the feed water side of the floating type membrane distillation module according to the present disclosure, and the treated water stored in the treated water side of the floating type membrane distillation module is cooled by the raw water.

In designing the floating type membrane distillation module, to increase the treated water production efficiency by the membrane distillation process, it is necessary to uniformly maintain a temperature difference between raw water and cooling water. In other words, uniformly maintaining a temperature difference between raw water and cooling water refers to uniform heating of raw water supplied to the feed water side of the membrane distillation module and effective supply of the heated raw water to the membrane distillation separation membrane.

The present disclosure proposes a floating type membrane distillation module with optimal structure for uniformly heating raw water supplied to the feed water side of the membrane distillation module and effectively supplying the heated raw water to the membrane distillation separation membrane.

Hereinafter, the floating type membrane distillation module according to an embodiment of the present disclosure will be described in detail with reference to the accompanying drawings.

Figure 1:
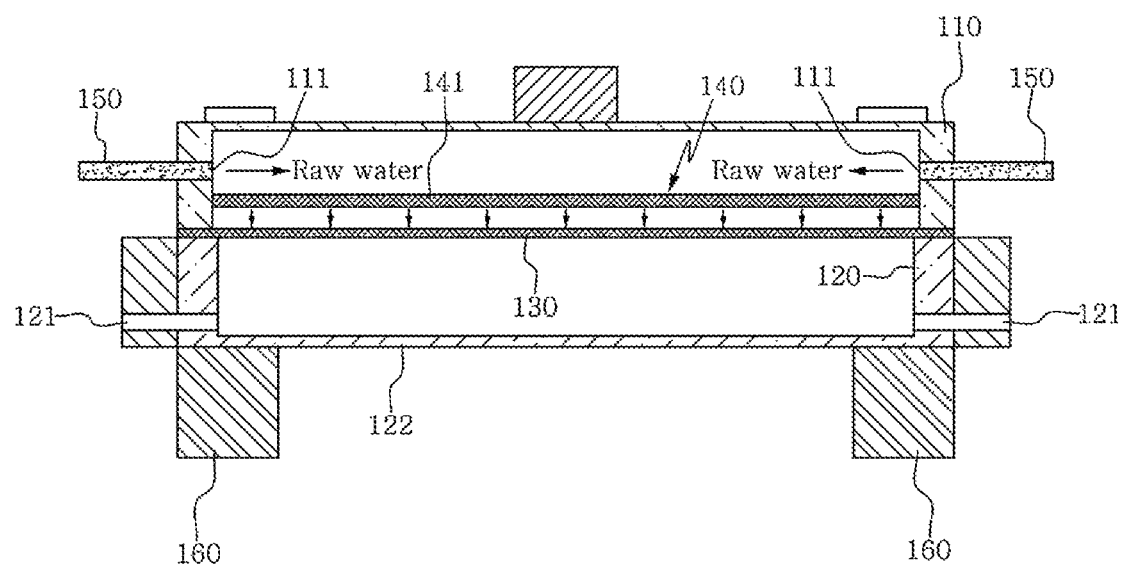
FIG. 1 is a cross-sectional view of a floating type membrane distillation module according to an embodiment of the present disclosure.
Figure 2:
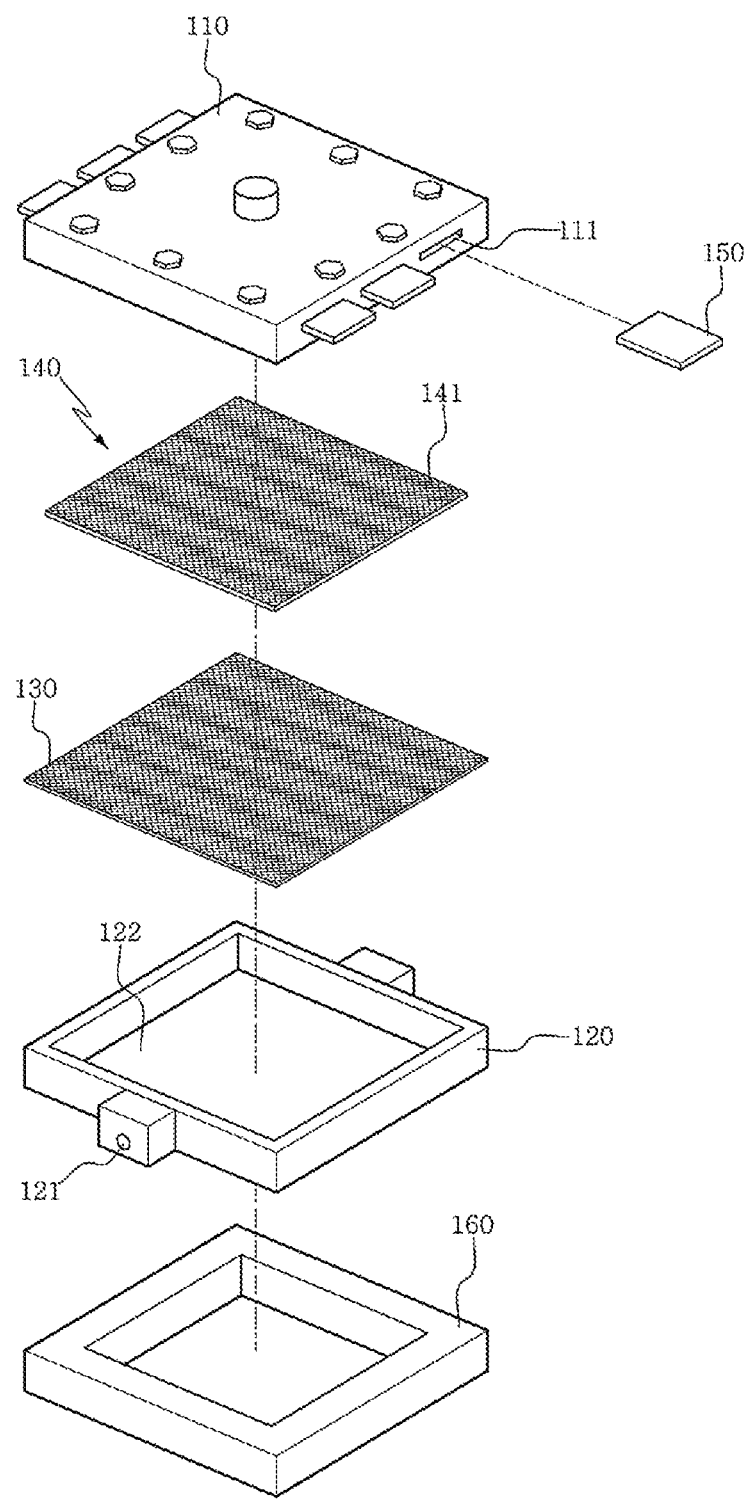
FIG. 2 is an exploded perspective view of a floating type membrane distillation module according to an embodiment of the present disclosure.

Referring to FIGS. 1 and 2, the floating type membrane distillation module according to an embodiment of the present disclosure includes an upper chamber 110 and a lower chamber 120. The upper chamber 110 corresponds to the feed water side, and the lower chamber 120 corresponds to the treated water side. Additionally, a membrane distillation separation membrane 130 is provided between the upper chamber 110 and the lower chamber 120. The raw water to be treated is supplied to the feed water side, i.e., the upper chamber 110, and a partial vapor pressure difference occurs due to a temperature difference between the upper chamber 110 and the lower chamber 120, and accordingly, vapor of the raw water passes through the membrane distillation separation membrane 130 and moves to the treated water side, i.e., the lower chamber 120. A raw water inlet 111 through which the raw water is introduced is provided on one side of the upper chamber 110, and a treated water outlet 121 for discharging the produced treated water is provided on one side of the lower chamber 120.

The floating type membrane distillation module according to the present disclosure including the upper chamber 110 and the lower chamber 120 is provided such that it floats on raw water to be treated, and the raw water on which the floating type membrane distillation module floats is water to be treated by the membrane distillation process and also serves as cooling water of the membrane distillation process. Additionally, to allow the floating type membrane distillation module to float, a float 160 is provided on one side of the lower end of the lower chamber 120 to provide buoyancy.

Meanwhile, to induce a temperature difference between the upper chamber 110 and the lower chamber 120, to be exact, to induce a temperature difference between the raw water of the upper chamber 110 and the lower chamber 120, it is necessary to increase the temperature of the raw water supplied to the upper chamber 110 and suppress the increase in temperature of the lower chamber 120.

To increase the temperature of the raw water supplied to the upper chamber 110, the upper chamber 110 is provided with a solar heat collector 140, and to suppress the increase in temperature of the lower chamber 120, a cooling plate 122 is provided on one side of the lower chamber 120.

The solar heat collector 140 collects sunlight to uniformly heat the raw water introduced into the upper chamber 110 and uniformly supply the heated raw water to the membrane distillation separation membrane 130. The solar heat collector 140 is formed in the shape of a plate with a plurality of pores 141, and is placed in an internal space of the upper chamber 110. To allow the solar heat collector 140 to heat the raw water and uniformly supply the heated raw water to the membrane distillation separation membrane 130, the solar heat collector 140 is provided between the raw water inlet 111 of the upper chamber 110 and the membrane distillation separation membrane 130 on the vertical basis.

Accordingly, the raw water introduced through the treated water inlet of the upper chamber 110 moves onto the solar heat collector 140, and as the solar heat collector 140 is heated by solar heat collection, the raw water having moved onto the solar heat collector 140 is uniformly heated by the solar heat collector 140, and the raw water uniformly heated on the solar heat collector 140 is uniformly supplied onto the membrane distillation separation membrane 130 through the plurality of pores 141 formed in the solar heat collector 140 at a predetermined interval.

Meanwhile, the plurality of pores 141 formed in the solar heat collector 140 plays a role in supplying the heated raw water onto the membrane distillation separation membrane 130 and discharging out bubbles separated from the raw water on the membrane distillation separation membrane 130. There are bubbles in the raw water supplied onto the membrane distillation separation membrane 130 through the solar heat collector 140, and when the bubbles are adsorbed onto the surface of the membrane distillation separation membrane 130, the bubbles act as a factor that reduces the effective membrane area of the membrane distillation separation membrane 130, reducing the membrane distillation process efficiency. The bubbles impede uniform distribution of the raw water and cause non-uniformity in raw water temperature. The bubbles present in the raw water on the membrane distillation separation membrane 130 are separated by floatation, and the bubbles separated by floatation are discharged out through the pores 141 of the solar heat collector 140, and through this, it is possible to suppress the adsorption of bubbles onto the surface of the membrane distillation separation membrane 130.

The solar heat collector 140 should be made of a material with high heat absorption and thermal conductivity, and in an embodiment, may be made of a metallic or nonmetallic material. Additionally, to enable heat collection using the solar heat collector 140, the upper surface of the upper chamber 110 may be formed with a transparent window, or the upper surface of the upper chamber 110 may be open.

Figure 3:
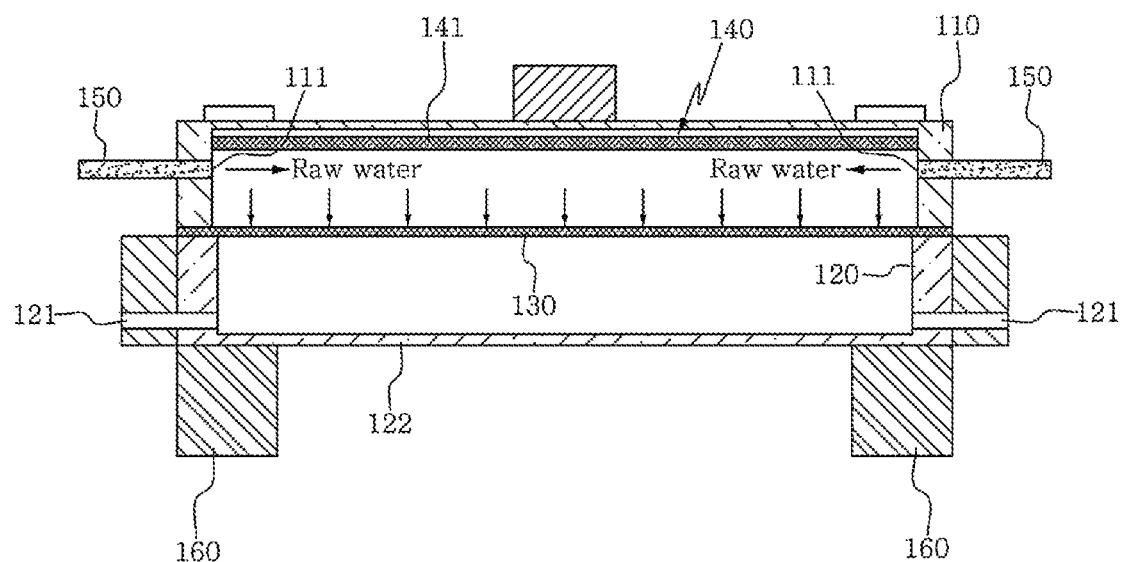
FIG. 3 is a cross-sectional view of a floating type membrane distillation module according to another embodiment of the present disclosure.

In the above description, although the embodiment is shown in which the solar heat collector 140 is provided between the raw water inlet 111 of the upper chamber 110 and the membrane distillation separation membrane 130 on the vertical basis, in other embodiment, the solar heat collector 140 may be provided above the raw water inlet 111 on the vertical basis as shown in FIG. 3.

When the solar heat collector 140 is provided above the raw water inlet 111 as in the embodiment of FIG. 3, the internal space of the upper chamber 110 is pre-heated by the solar heat collector 140, and in this state, when the raw water is introduced into the upper chamber 110 through the raw water inlet 111, the introduced raw water is directly supplied onto the membrane distillation separation membrane 130 and is heated through radiant heat by the solar heat collector 140 and convection of the internal space of the upper chamber.

Additionally, in the same way as the embodiment of FIG. 1, bubbles present in the raw water on the membrane distillation separation membrane 130 are separated by floatation, and the bubbles separated by floatation are discharged out through the pores 141 of the solar heat collector 140, and through this, it is possible to suppress the adsorption of bubbles onto the surface of the membrane distillation separation membrane 130.

Meanwhile, the cooling plate 122 is provided on one side of the lower chamber 120 as described above. To be exact, the lower surface of the lower chamber 120 is formed with the cooling plate 122. As described above, the floating type membrane distillation module according to the present disclosure is provided such that it floats on raw water, and the raw water on which the floating type membrane distillation module floats is water to be treated by the membrane distillation process and also serves as cooling water of the membrane distillation process.

The raw water supplied to the upper chamber 110 is heated by the solar heat collector 140, while the raw water on which the floating type membrane distillation module including the lower chamber 120 floats maintains lower temperature. Accordingly, the temperature of the raw water in contact with the lower chamber 120 maintaining lower temperature undergoes heat transfer through the cooling plate 122, and thus the internal temperature of the lower chamber 120 is maintained lower than the upper chamber 110.

Meanwhile, a filter member 150 may be provided at the raw water inlet 111 of the upper chamber 110. That is, the raw water may be allowed to pass through the filter member 150 and be introduced into the solar heat collector 140 of the upper chamber 110 through the raw water inlet 111. The filter member 150 plays a role in filtering out organic contaminants and fine particles included in the raw water, and may be formed in the form of a particulate filtration material or a filtration membrane. Additionally, the filter member 150 may be made of an adsorptive material, or a filtration material and an adsorptive material in combination.

Hereinabove, the configuration of the floating type membrane distillation module according to an embodiment of the present disclosure has been described. Hereinafter, the operation of the floating type membrane distillation module having the above-described configuration, i.e., a method for producing treated water using the floating type membrane distillation module will be described.

First, the floating type membrane distillation module according to an embodiment of the present disclosure is provided such that it floats on raw water to be treated. The solar heat collector 140 provided over the entire surface of the upper chamber 110 inside the upper chamber 110 collects sunlight and is heated.

In this state, the raw water to be treated is introduced into the upper chamber 110 through the raw water inlet 111 of the upper chamber 110 and supplied onto the solar heat collector 140. As the solar heat collector 140 is heated by solar heat collection, the raw water supplied onto the solar heat collector 140 is heated by the solar heat collector 140. The raw water heated by the solar heat collector 140 moves down through the plurality of pores 141 formed in the solar heat collector 140 at a predetermined interval and is uniformly supplied onto the membrane distillation separation membrane 130. Here, the filter member 150 is provided at the raw water inlet 111 to filter out organic contaminants, so that the raw water passes through the filter member 150 and is supplied into the upper chamber 110 through the raw water inlet 111.

While the raw water is heated by the solar heat collector 140 and moves onto the membrane distillation separation membrane 130 through the pores 141, the inside of the lower chamber 120 maintains lower temperature than the raw water temperature of the upper chamber 110 by the cooling plate 122. The temperature of the raw water in contact with the lower chamber 120 maintaining lower temperature undergoes heat transfer through the cooling plate 122, and thus the internal temperature of the lower chamber 120 is maintained lower than the upper chamber 110.

Accordingly, a temperature difference occurs between the temperature of the raw water supplied onto the membrane distillation separation membrane 130 and the internal temperature of the lower chamber 120 with respect to the membrane distillation separation membrane 130, and this temperature difference induces a partial vapor pressure difference so that the raw water on the membrane distillation separation membrane 130 turns into vapor and the corresponding vapor passes through the membrane distillation separation membrane 130 and moves to the lower chamber 120. The vapor having moved to the lower chamber 120 condenses when contacted with the cooling plate 122, and through this, treated water is produced. The produced treated water moves to a treatment tank (not shown) through the treated water outlet 121 provided on one side of the lower chamber 120, and a series of membrane distillation processes according to the present disclosure are completed.

In the above description, although the membrane distillation process is Air Gap Membrane Distillation (AGMD), the membrane distillation process may be one of Direct Contact Membrane Distillation (DCMD) process, Vacuum Membrane Distillation (VMD) process and Sweep Gas Membrane Distillation (SGMD) process. Additionally, for post-treatment of the treated water, an apparatus for supplying a calcium carbonate ($CaCO_3$)-based material or an ion exchanger for supplying ions may be additionally provided at the rear end of the treatment tank to increase alkalinity of the treated water to improve corrosion resistance. Along with this, a plurality of floating type membrane distillation modules according to an embodiment of the present disclosure may be combined in grid pattern, and in this case, the plurality of floating type membrane distillation modules may be connected to one treatment tank.

Hereinabove, the floating type membrane distillation module according to an embodiment of the present disclosure and its operation have been described. Subsequently, the present disclosure will be described in more detail through experimental examples.

Figure 4A:
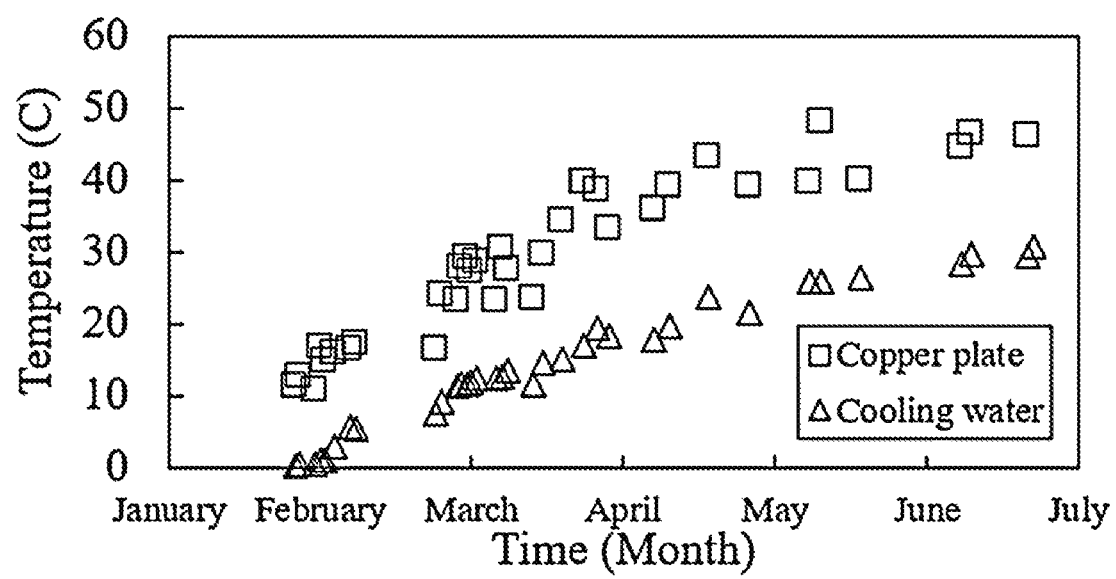
FIGS. 4A and 4B show the experimental results of the related art.
Figure 4B:
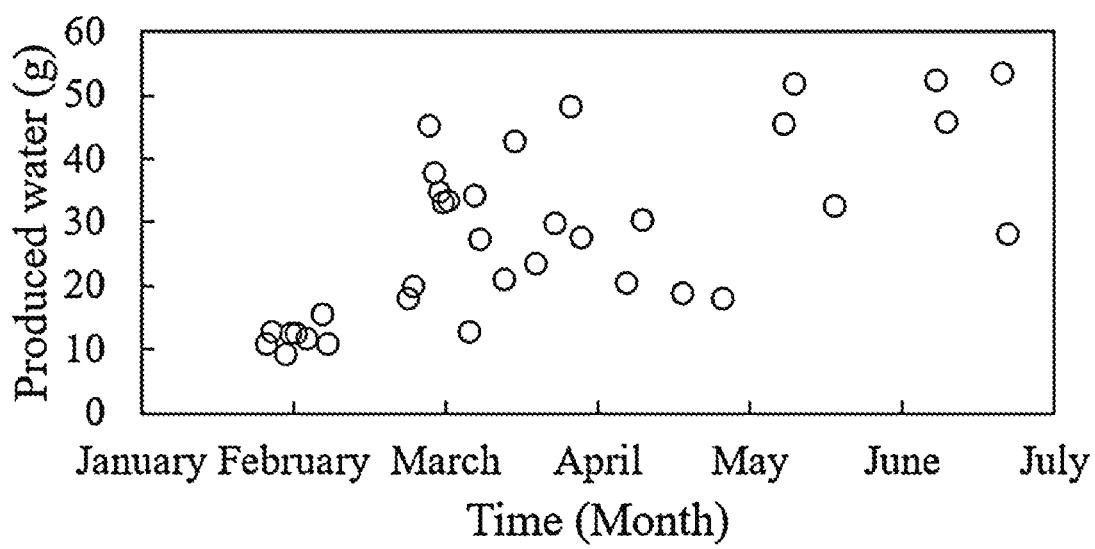
Figure 5A:
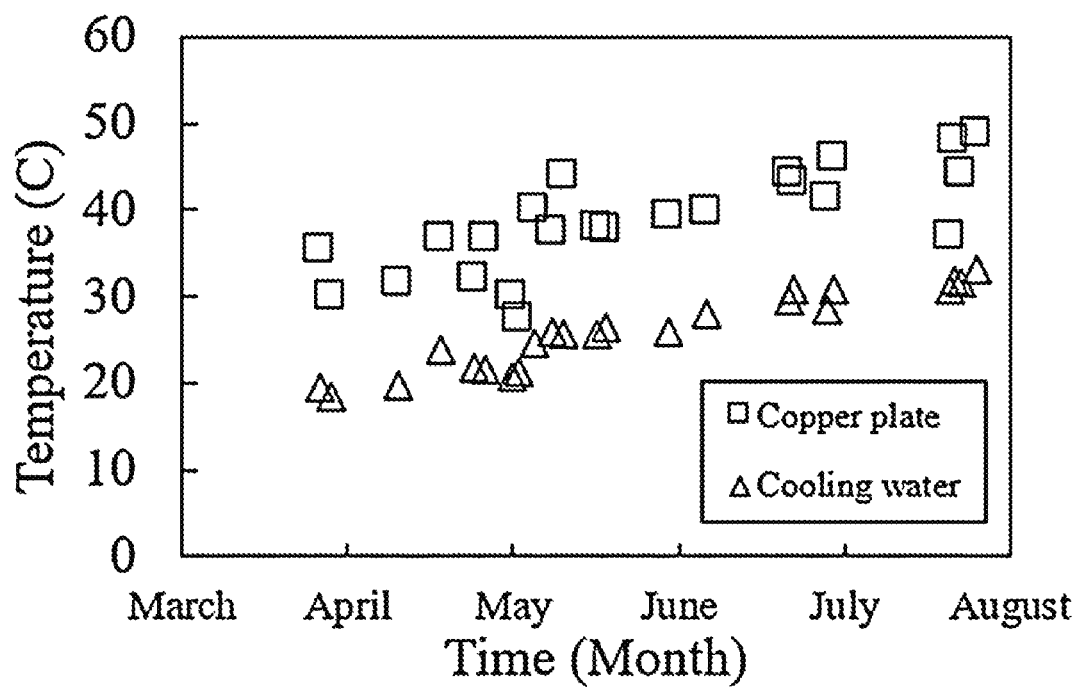
FIGS. 5A and 5B show the experimental results of the present disclosure.
Figure 5B:
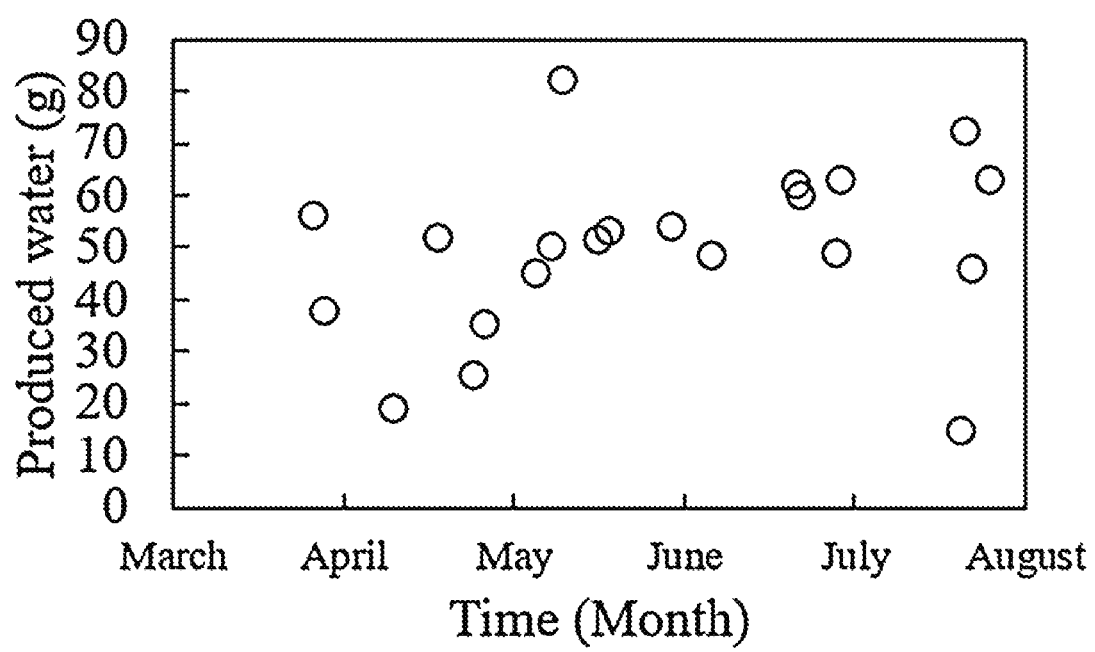

The membrane distillation process is each performed on the floating type membrane distillation module using the solar heat collector with no pore (hereinafter referred to as 'related art') and the floating type membrane distillation module using the solar heat collector with pores (hereinafter referred to as 'the present disclosure'). In the case of the related art, the process is performed for six months from February to July in 2017, and in the case of the present disclosure, the process is performed for five months from April to August in 2017. Both the solar heat collectors of the related art and the present disclosure are made of copper (copper plate). FIGS. 4A and 4B show the experimental results of the related art; FIG. 4A shows the temperature of the solar heat collector and cooling water (raw water), and FIG. 4B shows an amount of treated water produced through the membrane distillation process. FIGS. 5A and 5B show the experimental results of the present disclosure; FIG. 5A shows the temperature of the solar heat collector and cooling water (raw water), and FIG. 5B shows an amount of treated water produced through the membrane distillation process.

Referring to FIGS. 4A and 5A, it can be seen that both the related art and the present disclosure have similar temperature differences between the solar heat collector and the cooling water (raw water). That is, it can be seen that even though the solar heat collector with pores is applied, it does not make a great temperature difference between the feed water side and the treated water side, compared to the solar heat collector with no pore.

By contrast, referring to FIGS. 4B and 5B, it can be seen that there is a difference between an amount of treated water produced according to the related art and an amount of treated water produced according to the present disclosure. It can be seen that in the case of the related art (see FIG. 4B), 50 g or less of treated water is produced irrespective of seasons, whereas in the case of the present disclosure (see FIG. 5B), about 50-80 g of treated water is produced for one half of a year or longer. With these results, it is presume that in the case of the present disclosure using the solar heat collector with pores, bubbles are discharged through the pores, which prevents a reduction in effective membrane area of the membrane distillation separation membrane due to bubbles, thereby improving the efficiency of the membrane distillation process.

What is claimed is:
1. A floating membrane distillation module, comprising:
an upper chamber into which raw water to be treated is introduced;
a lower chamber in which treated water is produced according to a membrane distillation process;
a membrane distillation separation membrane provided between the upper chamber and the lower chamber;
a solar heat collector provided in an internal space of the upper chamber to heat the raw water introduced into the upper chamber; and
a float provided on one side of a lower end of the lower chamber to provide buoyancy,
wherein the raw water on the membrane distillation separation membrane turns into vapor by a temperature difference between the upper chamber and the lower chamber, the vapor of the raw water passes through the membrane distillation separation membrane and moves to the lower chamber, and the vapor having moved to the lower chamber condenses, producing treated water,
wherein a raw water inlet through which the raw water is introduced is provided on one side of the upper chamber, and the solar heat collector is formed in a shape of a plate with a plurality of pores,
the solar heat collector is provided between the raw water inlet of the upper chamber and the membrane distillation separation membrane on vertical basis, the raw water introduced through the raw water inlet of the upper chamber is supplied onto the solar heat collector and is heated, and the heated raw water is supplied onto the membrane distillation separation membrane through the plurality of pores provided in the solar heat collector, and bubbles included in the raw water are separated by floatation, and discharged out through the pores of the membrane distillation separation membrane.

2. The floating membrane distillation module according to claim 1, wherein a filter member is provided at the raw water inlet of the upper chamber, and the raw water passes through the filter member and is supplied onto the solar heat collector through the raw water inlet.

3. The floating membrane distillation module according to claim 1, further comprising:

a cooling plate provided on a lower surface of the lower chamber to cause the vapor to condense, producing treated water.

4. The floating membrane distillation module according to claim 2, wherein the filter member filters out contaminants included in the raw water, and is formed in the form of a particulate filtration material or a filtration membrane.

5. The floating membrane distillation module according to claim 2, wherein the filter member is made of an adsorptive material, or a filtration material and an adsorptive material in combination.

6. The floating membrane distillation module according to claim 1, wherein a raw water inlet through which raw water is introduced is provided on one side of the upper chamber, and the solar heat collector is formed in a shape of a plate, the solar heat collector is provided above the raw water inlet on vertical basis, the raw water introduced through the raw water inlet of the upper chamber is supplied onto the membrane distillation separation membrane and is heated, and bubbles included in the raw water are separated by floatation, and discharged out through the pores of the membrane distillation separation membrane.

* * * * *